US006553186B1

(12) United States Patent
Cornell

(10) Patent No.: US 6,553,186 B1
(45) Date of Patent: Apr. 22, 2003

(54) CAMERA VIEWFINDER WITH AIMING AID

(75) Inventor: David J. Cornell, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/174,309

(22) Filed: Jun. 18, 2002

(51) Int. Cl.[7] .............................................. G03B 13/02
(52) U.S. Cl. .......................... 396/373; 396/375; 33/266
(58) Field of Search .................................. 396/373, 375, 396/377, 378, 381, 383, 296; 33/266, 290

(56) References Cited

U.S. PATENT DOCUMENTS

| 4,891,658 A | | 1/1990 | Goddard | |
| 4,893,141 A | | 1/1990 | Smart | |
| 5,218,393 A | * | 6/1993 | Nakamura et al. | 396/373 |
| 5,335,033 A | * | 8/1994 | Ruben et al. | 396/375 |
| 5,502,523 A | * | 3/1996 | Ohno et al. | 396/373 |
| 6,122,455 A | * | 9/2000 | Hines | 396/385 |

* cited by examiner

Primary Examiner—Russell Adams
Assistant Examiner—Michelle Nguyen
(74) Attorney, Agent, or Firm—Roger A. Fields

(57) ABSTRACT

A viewfinder informs the photographer when a camera is tilted relative to a subject to be photographed. The viewfinder includes a pair of front and rear openings optically aligned to view the subject through the two openings, and a translucent element surrounding the front opening to permit a halo of light around the front opening which can be seen through the rear opening. The rear opening is dimensioned sufficiently smaller than the front opening to prevent one from viewing through the rear opening various portions of the halo of light depending on whether the camera is tilted up, down, right or left. Thus, one is alerted when the camera is tilted relative to the subject.

11 Claims, 3 Drawing Sheets

CAMERA VIEWFINDER WITH AIMING AID

FIELD OF THE INVENTION

The invention relates generally to a viewfinder for a camera and in particular to a viewfinder with an aiming aid that informs the photographer when the camera is improperly tilted relative to a subject to be photographed.

BACKGROUND OF THE INVENTION

All cameras include a viewfinder for defining, i.e., framing, the area of a subject intended to be included in the picture.

When a camera is improperly tilted up, down, right or left relative to a subject to be photographed, a corresponding edge portion of the area of the subject intended to be included in the picture may be omitted. Unfortunately most viewfinders do not alert the photographer to this problem.

Prior art commonly-assigned U.S. Pat. No. 4,891,658 issued Jan. 2, 1990 and U.S. Pat. No. 4,893,141 issued Jan. 9, 1990 disclose solutions to the problem by providing a viewfinder with an aiming aid that informs the photographer when a camera is improperly tilted relative to a subject to be photographed. In the patents, a front aiming or target ring defines a front framing opening for aiming the camera at the subject. The front framing opening is optically aligned with a similar-shaped rear viewing opening. One views the subject by looking through the rear viewing opening to frame the aiming ring around the area of the subject intended to be included in the picture. When the camera is improperly tilted up, down, right or left relative to the subject, the aiming ring blocks a corresponding edge portion of the area from one's view through the rear viewing opening.

SUMMARY OF THE INVENTION

According to one aspect of the invention a viewfinder that informs the photographer when a camera is tilted relative to a subject to be photographed comprises:

a pair of front and rear openings optically aligned to view a subject through the two openings; and a translucent element surrounding the front opening to permit a halo of light around the front opening which can be seen through the rear opening;

and wherein the rear opening is dimensioned sufficiently smaller than the front opening to prevent one from viewing through the rear opening various portions of the halo of light depending on whether the camera is tilted up, down, right or left, whereby one is alerted when the camera is tilted relative to a subject.

According to another aspect of the invention a method of alerting the photographer when a camera is tilted relative to a subject to be photographed comprises:

providing a halo of light around a front viewfinder opening in a camera which can be seen through a rear viewfinder opening in the camera when the camera is properly aimed at a subject, and preventing one from viewing through the rear viewfinder opening various portions of the halo of light depending on whether the camera is tilted up, down, right or left relative to the subject, whereby one is alerted when the camera is improperly tilted relative to the subject.

DETAILED DESCRIPTION OF THE INVENTION

Figure 1:
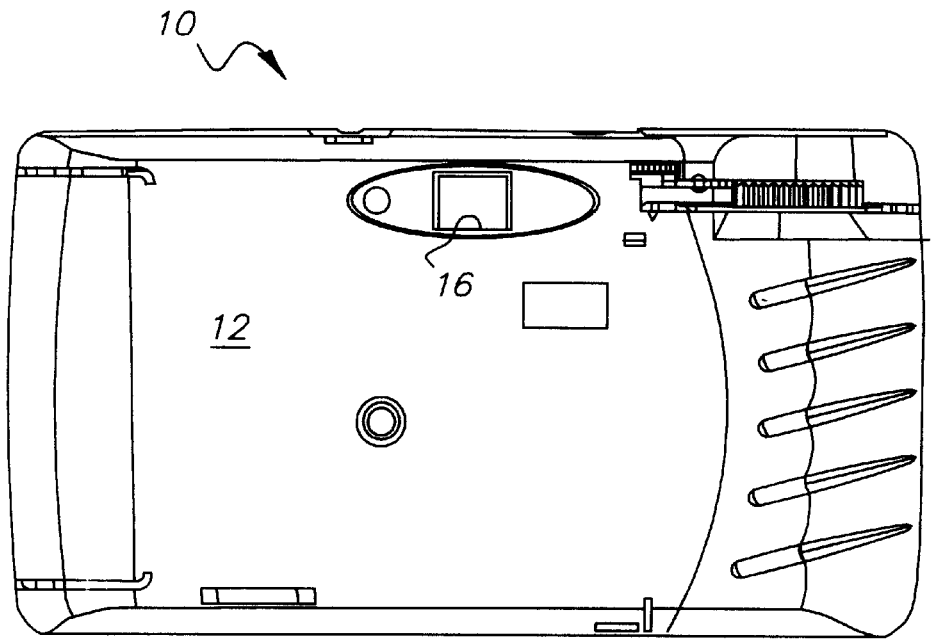
FIG. 1 is a rear elevation view of a camera including a viewfinder that informs the photographer when the camera is improperly tilted relative to a subject to be photographed.
Figure 2:
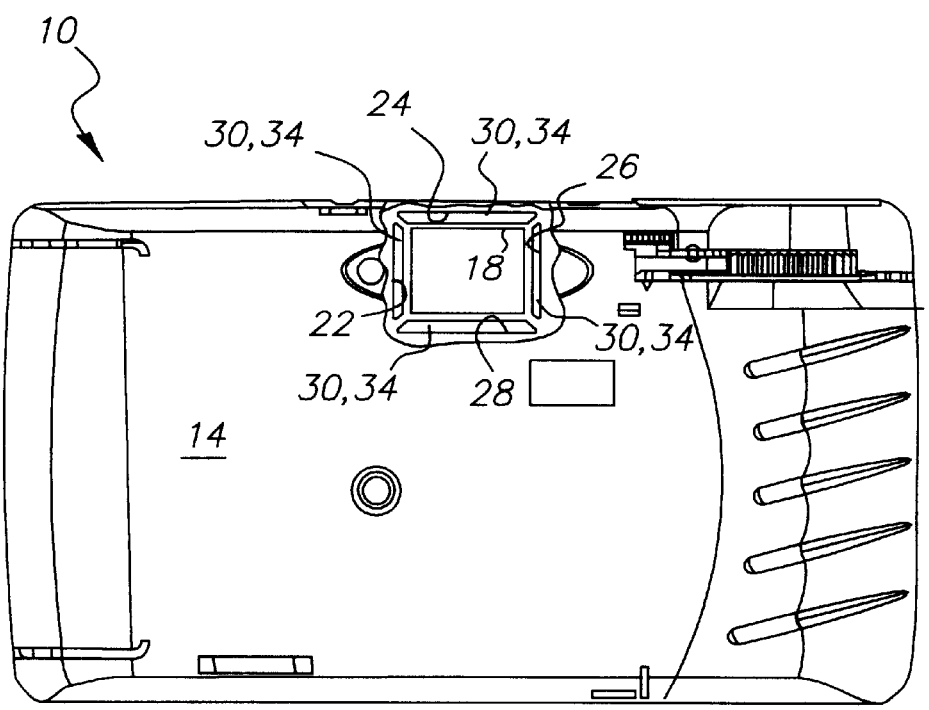
FIG. 2 is a rear elevation view similar to FIG. 1, showing a rear cover part of the camera partially cut away to reveal a front opening of the viewfinder.
Figure 3:
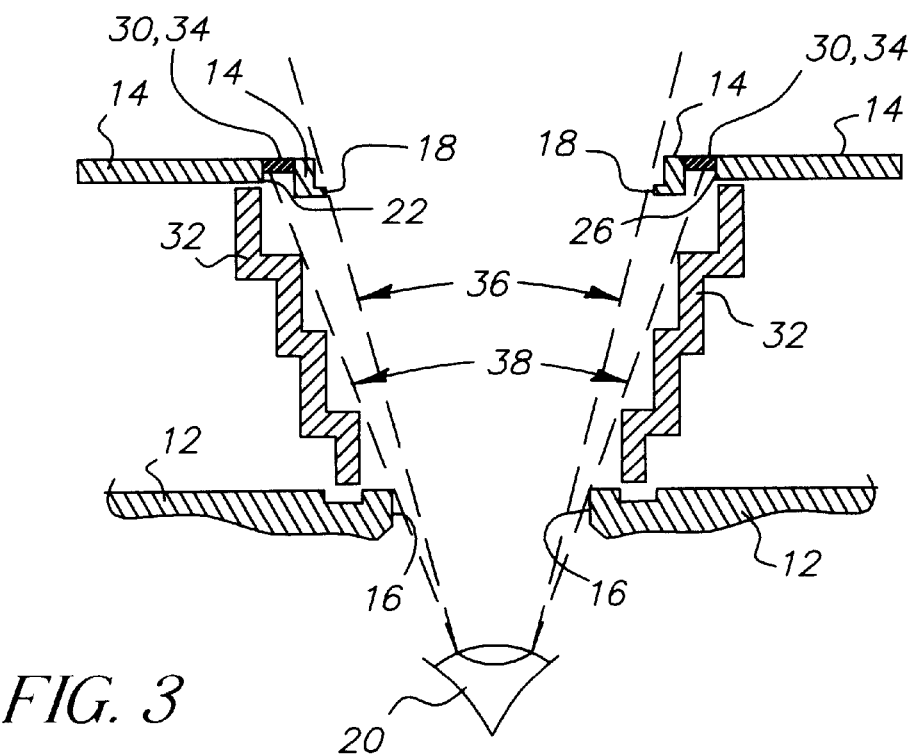
FIG. 3 is a schematic cross-section view of one embodiment of the viewfinder.

FIGS. 1–3 show a one-time-use camera 10 having a pair of opaque black rear and front cover parts 12 and 14 with rear and front viewfinder openings 16 and 18 that are optically aligned for one's eye 20 to view a subject through the two openings. The rear and front openings 16 and 18 are rectangularly shaped and have the same aspect ratio (which preferably is similar to the aspect ratio of each exposed film frame in the camera 10).

Four narrow openings 22, 24, 26 and 28 are provided in the front cover part 14 to permit light to pass through the narrow openings. See FIG. 2. The four narrow openings 22, 24, 26 and 28 closely surround the front viewfinder opening 18 to form a rectangular pattern. A translucent colored (e.g. red or orange) element 30 is supported at each of the narrow openings 22, 24, 26 and 28. In one embodiment shown in FIG. 3, the translucent element 30 is supported as separate pieces in each of the narrow openings 22, 24, 26 and 28. In another embodiment shown in FIG. 4, the translucent element 30 is supported as a single sheet across each of the narrow openings 22, 24, 26 and 28. The term "translucent" as is known generically means permitting the passage of light, and therefore includes both transparent material for transmitting light so that objects beyond it can be clearly seen and non-transparent material for transmitting and diffusing light so that objects beyond it cannot be clearly seen.

Figure 4:
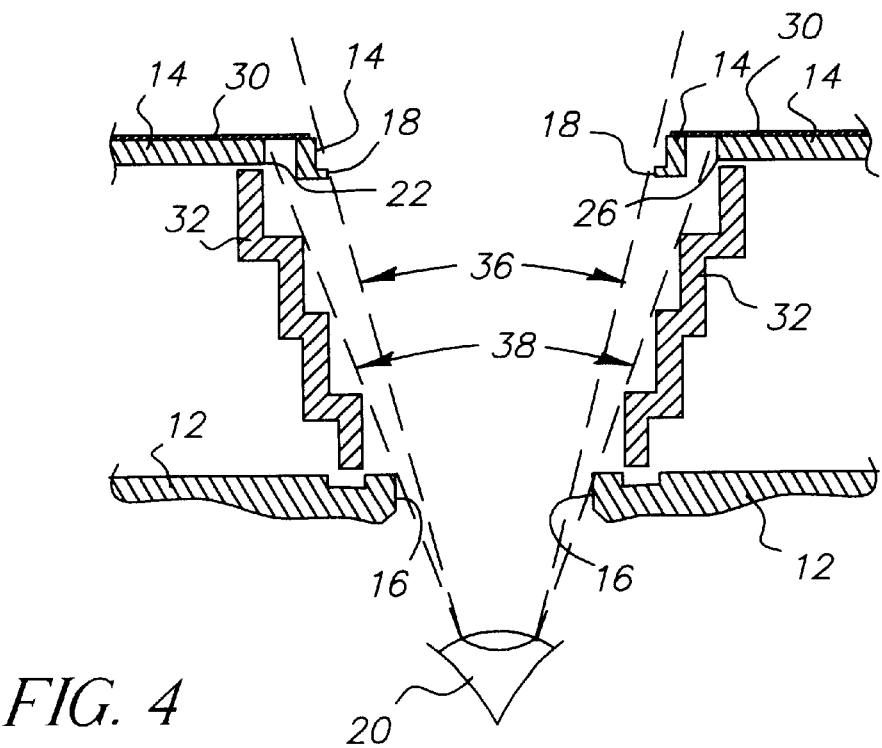
FIG. 4 is a schematic cross-section view similar to FIG. 3, showing another embodiment of the viewfinder.

A known-type opaque black light baffle 32 is arranged between the rear viewfinder opening 16 and the four narrow openings 22, 24, 26 and 28 as shown in FIGS. 3 and 4. The baffle 32 confines light between the rear and front viewfinder openings 16 and 18 from scattering beyond the four narrow openings 22, 24, 26 and 28 (including respective portions of the translucent element 30 at the narrow openings).

Figure 5:
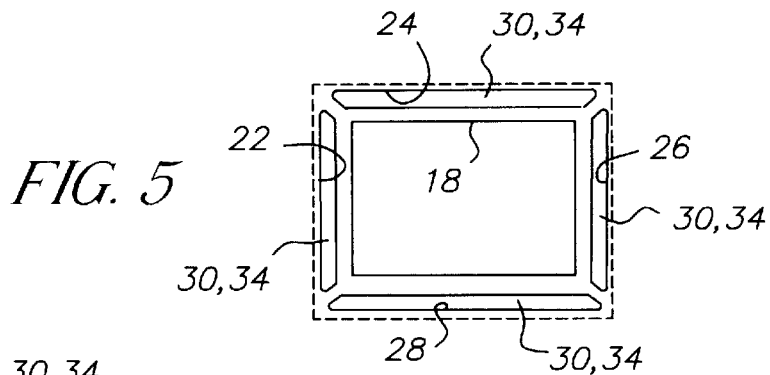
FIG. 5 is a rear elevation view of either embodiment of the viewfinder, depicting the view through the viewfinder when the camera is properly positioned relative to the subject.
Figure 6:
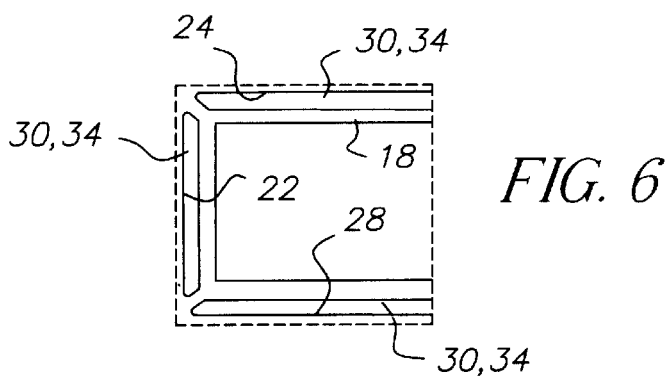
FIG. 6 is a elevation view similar to FIG. 5, depicting the view through the viewfinder when the camera is improperly tilted left relative to the subject.
Figure 7:
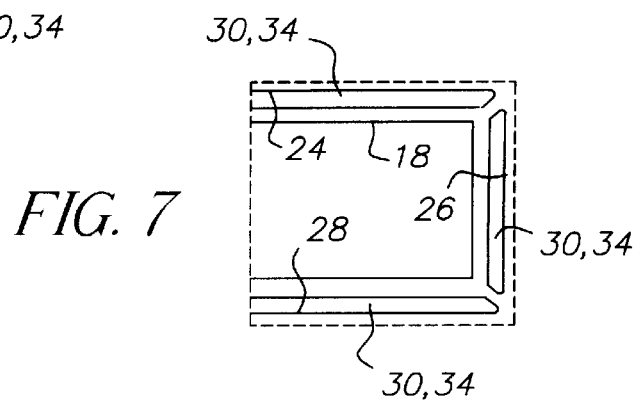
FIG. 7 is a rear elevation view similar to FIG. 5, depicting the view through the viewfinder when the camera is improperly tilted right relative to the subject.
Figure 8:
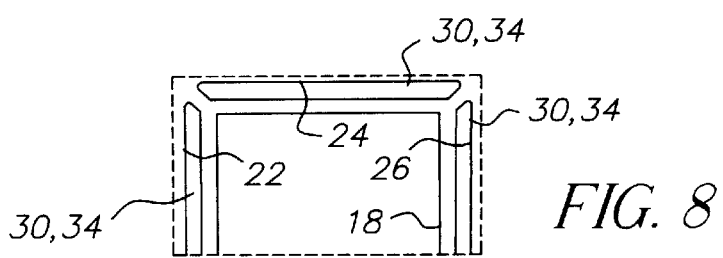
FIG. 8 is a rear elevation view similar to FIG. 5, depicting the view through the viewfinder when the camera is improperly tilted down relative to the subject.
Figure 9:
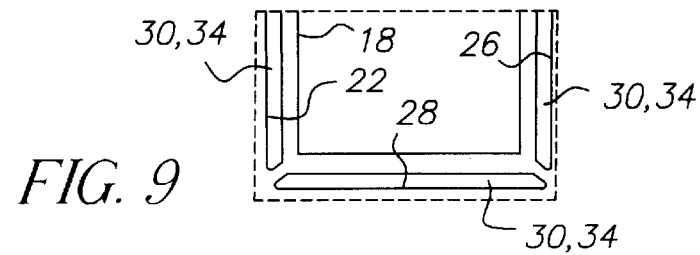
FIG. 9 is a rear elevation view similar to FIG. 5, depicting the view through the viewfinder when the camera is improperly tilted up relative to the subject.

The rear viewfinder opening 16 is dimensioned sufficiently smaller than the front viewfinder opening 18 so that the angle of view of the subject 36 as seen from the rear viewfinder opening 16 is smaller than the permissible (total possible) angle of view 38 when one's eye 20 is close to the rear viewfinder opening 16. See FIGS. 3 and 4. The permissible angle of view 38 frames the four narrow openings 22, 24, 26 and 28 (including respective portions of the translucent element 30 at the narrow openings). Since the translucent element 30 surrounds the front viewfinder opening 18, it permits a broken (non-continuous) rectangular halo of light 34 to exist around the front viewfinder opening which can be seen through the rear viewfinder opening 18 as shown in FIG. 5. The rear viewfinder opening 16 is dimensioned sufficiently smaller than the front viewfinder opening 18 to prevent one from viewing through the rear viewfinder opening various portions of the halo of light 34 depending on whether the camera 10 is tilted left in FIG. 6, right in FIG. 7, down in FIG. 8, or up in FIG. 9. This is to alert one when the camera 10 is improperly tilted relative to the subject.

The invention has been described in detail with particular reference to certain preferred embodiments thereof, but it will be understood that variations and modifications can be effected within the spirit and scope of the invention. For example, although the rear and front viewfinder openings 16 and 18 are depicted without rear and front lenses, known-type lenses could be added.

PARTS LIST 10. camera
12. rear cover part
14. front cover part
16. rear viewfinder opening
18. front viewfinder opening
20. one's eye
22. narrow opening
24. narrow opening
26. narrow opening
28. narrow opening
30. translucent element
32. baffle
34. halo of light
36. angle of view of subject
38. permissible (total possible) angle of view

What is claimed is:

1. A viewfinder that informs the photographer when a camera is tilted relative to a subject to be photographed comprises:

a pair of front and rear openings optically aligned to view a subject through said openings; and a translucent element surrounding said front opening to permit a halo of light around said front opening which can be seen through said rear opening;

and wherein said rear opening is dimensioned sufficiently smaller than said front opening to prevent one from viewing through said rear opening various portions of said halo of light depending on whether the camera is tilted up, down, right or left, whereby one is alerted when the camera is tilted relative to a subject.

2. A viewfinder as recited in claim 1, wherein a baffle is arranged between said rear opening and said translucent element to confine light between said front and rear openings from scattering beyond said translucent element.

3. A viewfinder as recited in claim 1, wherein said front and rear openings are each rectangularly shaped.

4. A viewfinder as recited in claim 1, wherein said translucent element is colored.

5. A viewfinder as recited in claim 1, wherein said front and rear openings are in front and rear cover parts of the camera.

6. A viewfinder as recited in claim 1, wherein said translucent element is disposed at a series of narrow openings surrounding said front opening.

7. A viewfinder as recited in claim 6, wherein said narrow openings are arranged in a rectangular pattern.

8. A viewfinder as recited in claim 1, wherein said front and rear openings are in front and rear cover parts of the camera, and said translucent element is disposed in a series of narrow openings in said front cover part which surround said front opening.

9. A viewfinder as recited in claim 1, wherein said front and rear openings are in front and rear cover parts of the camera, and said translucent element is disposed on said front cover part to extend across a series of narrow openings in said front cover part which surround said front opening.

10. A method of alerting the photographer when a camera is tilted relative to a subject to be photographed comprises:

providing a halo of light around a front viewfinder opening in a camera which can be seen through a rear viewfinder opening in the camera when the camera is properly aimed at a subject; and;

preventing one from viewing through the rear viewfinder opening various portions of the halo of light depending on whether the camera is tilted up, down, right or left relative to the subject, whereby one is alerted when the camera is improperly tilted relative to the subject.

11. A viewfinder that informs the photographer when a camera is tilted relative to a subject to be photographed comprises:

means for providing a halo of light around a front viewfinder opening in a camera which can be seen through a rear viewfinder opening in the camera when the camera is properly aimed at a subject; and;

means for preventing one from viewing through the rear viewfinder opening various portions of the halo of light depending on whether the camera is tilted up, down, right or left relative to the subject, whereby one is alerted when the camera is improperly tilted relative to the subject.

* * * * *